United States Patent [19]

Arnold

[11] 4,289,939
[45] Sep. 15, 1981

[54] LONGITUDINAL BALANCE ARRANGEMENTS FOR TWO-TO-FOUR WIRE TELECOMMUNICATION LINE CIRCUITS

[75] Inventor: John S. Arnold, Nether Heyford, England

[73] Assignee: The Plessey Company Limited, Ilford, England

[21] Appl. No.: 108,179

[22] Filed: Dec. 28, 1979

[30] Foreign Application Priority Data

Dec. 30, 1978 [GB] United Kingdom ............... 50385/78

[51] Int. Cl.$^3$ ............................................ H04M 1/76
[52] U.S. Cl. ............................ 179/170 D; 179/16 F; 179/70
[58] Field of Search ................... 179/16 AA, 16 F, 70, 179/77, 170 D, 170 NC, 18 FA; 323/68

[56] References Cited

U.S. PATENT DOCUMENTS 3,187,104  6/1965  Ebel .................................. 179/16 F
4,132,863  1/1979  Smith ................................ 179/16 F Primary Examiner—Bernard Konick
Assistant Examiner—Randall P. Myers
Attorney, Agent, or Firm—Fleit & Jacobson

[57] ABSTRACT

A conventional interface for 2-wire telephone lines to a digital switch includes line current feed resistors and a bridge circuit where the line impedance is compared with a compromise balance network. The accuracy of the balance determines the proportion of the signal received on the receive pair being retransmitted in the transmit direction. The ratio of these signals is known as the Trans-Hybrid loss and should be as high as possible for good quality speech.

In practice the telephone line impedance increases with length as also does the DC resistance of the line and thus the line current, assuming a constant voltage source.

It is proposed that the line current feed resistors be formed on a common substrate using well-established film deposition techniques and the balance resistor be formed on the same substrate using a material having a negative temperature coefficient. Thus on short lines the dissipation in the line feed resistors is high, raising the temperature of the substrate, thus reducing the value of the balance resistor and hence improving the balance.

3 Claims, 1 Drawing Figure

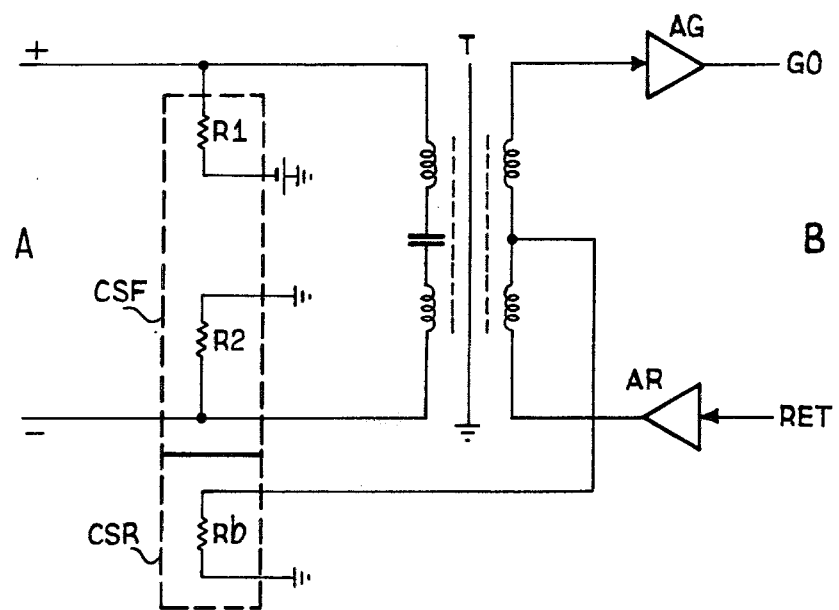

LONGITUDINAL BALANCE ARRANGEMENTS FOR TWO-TO-FOUR WIRE TELECOMMUNICATION LINE CIRCUITS

The present invention relates to two-to-four wire telecommunication line circuits and is more particularly concerned with improving the accuracy of the longitudinal balance impedance in such circuits.

The conventional interface (line circuit) for 2-wire telephone lines to a digital switch includes line current feed resistors and a bridge circuit where the line impedance is compared with a compromise longitudinal balance resistor. The accuracy of the longitudinal balance resistor determines the proportion of the signal received on the received pair which is passed through the hybrid to the transmit side of the four-wire circuit. The ratio of these signals is known as the Trans-Hybrid loss and should be as high as possible for good quality speech.

In practise the telephone line impedance increases with line length as does the d.c. resistance of the line. Accordingly the balance resistor of each line circuits requires individual adjustment to compensate for the length of telephone line connected to that line circuit.

It is an aim of the present invention to provide automatic compensation in such circumstances.

According to the invention there is provided a two-to-four wire telecommunications line circuit including line current feed resistors connected to the subscribers line on the two-wire side of the line circuit and a balance impedance connected in the four-wire side of the line circuit and the balance impedance includes a resistive component which is thermally coupled to the line current feed resistors and is formed of a material having a negative temperature coefficient.

Preferably the line current feed resistors are formed on a common substrate using well established film deposition techniques and the balance resistor is formed on the same substrate; typically on the opposite face from that upon which the line current feed resistors are formed.

The invention will be more readily understood from the following description which should be read in conjunction with the accompanying drawing which shows in broad outline a two-to-four wire line circuit incorporating one embodiment of the invention.

The line circuit comprises a two-wire side A and a four-wire side B. The two-wire side comprises two conductors + and − which are connected over the subscribers telephone lines to the subscribers premises and telephone instrument. The four-wire side of the line circuit comprises a go-path GO (involving amplifier AG) and a return-path RET (involving amplifier AR) and these paths will provide input and output connections on the codec equipment of the digital exchange. Such codec equipment is not shown in the drawing since it plays no part in this invention. Typically the codec equipment will be used to convert speech currents received from the subscribers line and routed to the go-path GO into digital samples and to convert digital samples into speech currents received from the return-path RET.

The adverse line conditions are isolated from the go and return path amplifiers AB and AR respectively by the transformer T which also performs the function of a hybrid circuit. The line circuit also includes line current feed resistors R1 and R2 and the balance impedance shown in the drawing as a resistor RB.

In practice, a standard telephone instrument is designed to operate within its specification when fed with current from a 200+200 ohm source from a 50 volt supply. These current feed resistors R1 and R2 also provide the line termination for the subscribers line. The telephone line impedance of course increases with line length as also does the d.c. resistance of the line. Thus the line current will also change in accordance with the d.c. resistance of the line assuming that the line voltage remains constant. Accordingly the line current fed to a subscribers line relates to the impedance of that line. On short lines the d.c. resistance of the line will be comparatively low and accordingly the line current taken will be high whereas the line impedance will be comparatively low. Alternatively on long lines the d.c. resistance of the line will be comparatively high with low line current and a comparatively high line impedance.

To provide automatic compensation in thse circumstances the line feed resistors R1 and R2 are thermally coupled to the balance resistor which is arranged to have a negative temperature co-efficient. Typically the line feed resistors R1 and R2 are formed on one side (e.g. the front) of a common substrate CSF whereas the balance resistor Rb is formed on the other face (e.g. the rear) of the common substrate CSR. Thus on short lines the dissipation in the line feed resistors is high raising the temperature of the substrate. Accordingly the value of the balance resistor Rb is automatically reduced to compensate for the low line impedance thereby improving the longitudinal balance of the line circuit. Alternatively on long lines the dissipation in the line feed resistors is low reducing the temperature of the substrate. Accordingly the value of the balance resistor Rb is automatically increased to compensate for the high line impedance thereby improving the longitudinal balance of the line circuit.

What we claim is:

1. A two-to-four wire telecommunications line circuit including line current feed resistors connected to the subscribers line on the two-wire side of the line circuit and a balance impedance connected in the four-wire side of the line circuit and the balance impedance includes a resistive component which is thermally coupled to the line feed resistors and is formed of a resistive material having a negative temperature co-efficient.

2. A two-to-four wire telecommunications line circuit according to claim 1 in which the line current feed resistors are formed using film deposition techniques on a common substrate and the balance impedance is formed on the same substrate.

3. A two-to-four wire telecommunications line circuit according to claim 2 in which the balance impedance is formed on the opposite face of the substrate from the face upon which the line current feed resistors are formed.

* * * * *